April 28, 1959  W. C. WELZ  2,884,590
ELECTRICAL WELL LOGGING SYSTEMS
Filed Oct. 16, 1956

INVENTOR.
WILBUR C. WELZ
BY
*William R. Sherman*
HIS ATTORNEY

United States Patent Office 2,884,590
Patented Apr. 28, 1959

2,884,590

ELECTRICAL WELL LOGGING SYSTEMS

Wilbur C. Welz, Houston, Tex., assignor, by mesne assignments, to Schlumberger Well Surveying Corporation, Houston, Tex., a corporation of Texas Application October 16, 1956, Serial No. 616,316

13 Claims. (Cl. 324—1)

The present invention relates to the electrical investigation of earth formations traversed by a borehole and more particularly to new and improved systems for controlling the potential and current distribution in earth formations adjacent to an electrical logging array passing through a borehole.

It has become accepted practice to obtain electrical resistivity logs of the earth formations traversed by a borehole by automatically controlling the potential and current distribution in the vicinity of an electrical logging array passing through a borehole, whereby the resistivity or conductivity indications are more nearly representative of the actual resistivity or conductivity sought to be measured. Exemplary types of such systems are disclosed in Patent No. 2,712,627 for "Electrical Resistivity Well Logging Method and Apparatus," No. 2,712,628 for "Electrical Logging Apparatus," and No. 2,712,629 for "Electrical Logging of Earth Formations Traversed by a Borehole," all issued July 5, 1955, to H. G. Doll. In these systems, a constant survey current emitted by a main electrode in the borehole is confined to a path substantially perpendicular to the borehole axis by auxiliary currents emitted from auxiliary electrodes spaced on opposite sides of the main electrode. The auxiliary currents are supplied by feedback amplifier means responsive to the potential gradient intermediate the electrodes, such currents serving to reduce the potential gradient substantially to zero.

In copending application Serial No. 356,467, filed May 21, 1953, for "Electrical Apparatus for Well Logging," by N. A. Schuster, now Patent 2,803,796, granted August 20, 1957, a system is disclosed wherein logging current emitted from the main electrode is supplied by feedback amplifier means responsive to the potential gradient intermediate the main and auxiliary electrodes to reduce the potential gradient substantially to zero. By these systems, resistivity or conductivity indications are obtained dependent upon the ratio of the survey current emitted from the main electrode and the potential at a point in the vicinity of the main electrode. Where such systems are operated with the electrodes in contact with a relatively low resistivity borehole fluid and particularly where the electrodes are opposite a formation of relatively high resistivity, the potential gradient to which the feedback amplifier means responds is relatively low and relatively non-responsive to changes in the currents supplied by the amplifier means. In some instances, a very high gain is required of the amplifier means in order that the current supplied by it may be adjusted with a desired degree of accuracy.

It is an object of the present invention to provide novel and improved well logging apparatus of the above character in which the demands made on the amplifier means under extreme borehole conditions are not as severe as they sometimes were in the previous practice.

Another object of the invention is to provide novel and improved apparatus of the above character in which the amplifying means is relatively non-responsive to the potential gradient under severe borehole conditions and yet is arranged to supply the correct current.

In accordance with the present invention, a main electrode and auxiliary electrodes spaced above and below the main electrode are arranged for movement through a borehole while current is emitted from the electrodes. The current emitted from one of the electrodes is supplied by amplifier means in accordance with the potential gradient between the electrodes and also in accordance with the potential of a point in the vicinity of the main electrode, whereby the potential gradient is maintained substantially at zero. When the ratio of the adjacent formation resistivity to the resistivity of the borehole fluid is relatively high and the potential gradient is therefore relatively low, the adjusted current required for maintaining the potential gradient substantially at zero is obtained in response primarily to the potential at the point. Gain requirements for the amplifier means are thereby rendered less severe.

In one embodiment of the invention, current is emitted from the auxiliary electrodes in an amount adjusted to maintain the potential at a point in the vicinity of the main electrode at a predetermined constant value. The amplifier means is made responsive to this potential of constant value and also to an amplified version of the potential gradient intermediate the electrodes for emitting current from the main electrode adjusted so as to reduce substantially to zero the potential gradient. In response to the magnitude of current emitted from the main electrode, indications are derived which represent the conductivity of adjacent earth formations. In another embodiment of the invention, substantially constant current is emitted from the main electrode, and the amplifier means is responsive to the potential gradient intermediate the electrodes for controlling the current emitted from the auxiliary electrodes so as to reduce the potential gradient substantially to zero. In response to the potential of a point in the vicinity of the main electrode, indications are derived representing the resistivity of adjacent earth formations. In a further embodiment of the invention, another form of electrode array is shown to illustrate that the invention may be practiced with a variety of electrode arrays.

The invention will be more fully understood with reference to the following detailed description taken in conjunction with the accompanying drawings, in which.

Figures 1, 2, 3:
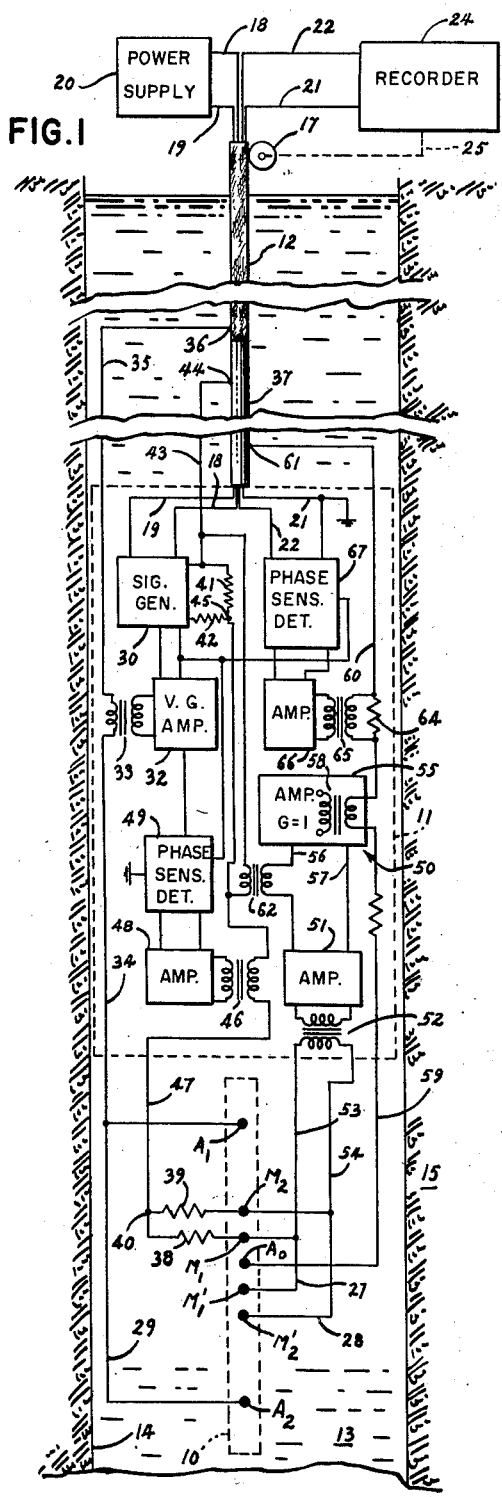
Fig. 1 is a schematic diagram of a well logging system in accordance with the present invention by which conductivity indications may be obtained.
Fig. 2 is a partial schematic diagram of a well logging system, in accordance with another embodiment of the invention, for producing resistivity indications.
Fig. 3 is a schematic diagram of an electrode array according to another embodiment of the invention, which may be substituted for the electrode array employed in the system of Fig. 1 or Fig. 2.

In Fig. 1 there is shown an electrode array 10 and a pressure-tight electronic cartridge 11 suspended from an electrical cable 12 for movement through relatively conductive well fluid 13 within a borehole 14 traversing earth formations 15. The cable may be connected to a winch (not shown) at the surface, means such as a measuring wheel 17 being employed to detect the net travel of the cable past a measuring point at the surface. A pair of cable conductors 18, 19 may be connected to a power supply 20 at the surface to transmit electric power down to the subsurface apparatus, while a second pair of cable conductors 21, 22 may connect with a suitable indicating device such as a galvanometric recorder 24 to provide indications of a measure signal transmitted up the cable. These indications may be recorded as a function of depth by providing a drive connection 25 between the measuring wheel 17 and the recorder 24.

While a variety of electrode arrays may be employed in the practice of the invention, the electrode array 10 may conveniently be of the type disclosed in the aforementioned H. G. Doll Patent No. 2,712,627. The electrode array 10 includes a central, main current electrode $A_0$ and auxiliary electrodes $A_1$ and $A_2$ spaced, respectively, above and below the main electrode $A_0$ so as to be symmetrical thereabout. Intermediate the main and auxiliary electrodes and in the vicinity of the main electrode are a pair of potential pick-up electrodes $M_1$, $M_2$ above the main electrode and a symmetrical pair of measuring electrodes $M_1'$, $M_2'$ below the main electrode. These pick-up electrodes are spaced longitudinally of the electrode array so as to be responsive to the potential gradient along the borehole. For convenience of illustrating the principles of the invention, symmetrically corresponding electrodes are connected by low resistance jumpers, although it is contemplated that separate control arrangements may be provided for the upper and lower sets of electrodes. As illustrated in Fig. 1, pick-up electrodes $M_1$ and $M_1'$ are connected by jumper 27, pick-up electrodes $M_2$ and $M_2'$ are connected by jumper 28, and auxiliary electrodes $A_1$ and $A_2$ are connected by jumper 29.

To obtain an emission of current from the auxiliary electrodes $A_1$, $A_2$, a signal generator 30 in the cartridge 11 has its input terminals connected to the power conductors 18, 19 and is energized by power supplied to it so as to generate an A.C. potential of, say, 400 c.p.s. This generated A.C. potential is applied to the input terminals of a variable gain amplifier 32 which may be of conventional form incorporating a stage responsive to a gain control signal to vary the overall gain of the amplifier. To obtain an auxiliary current output from the variable gain amplifier 32 adjusted in accordance with its gain, the output of the amplifier may be coupled by a transformer 33 having one terminal of its secondary winding connected by insulated conductor 34 to the auxiliary electrodes $A_1$, $A_2$ and the other terminal connected by insulated conductor 35 to a remote current return point 36. The current return may be provided, if desired, by an exposed portion of cable armor spaced above the head of the cartridge 11 by a length of insulation 37 on the order of 100 feet. Where such a current return is provided, auxiliary current emitted from the auxiliary electrodes $A_1$, $A_2$ is returned at the cable armor.

It will be recognized that apparent formation conductivity is proportional to the ratio of the current emitted from the main electrode $A_0$ and the potential of a point in the vicinity of the main electrode measured with respect to the potential of a relatively remote reference point. In order to obtain conductivity indications without actually computing this ratio, the potential may be maintained constant, as taught in the aforementioned application Serial No. 356,467, and the magnitude of the current measured. To this end, the pick-up electrodes $M_1$ and $M_2$ are connected by a pair of equal resistors 38, 39 in series, so that the potential at their junction point 40 represents the potential of a point intermediate the pick-up electrodes $M_1$, $M_2$ and in the vicinity of the main electrode $A_0$. Across the output terminals of the signal generator 30, a pair of resistors 41, 42 are serially connected to form a potential divider. As one terminal of resistor 41 is connected by conductor 43 to a remote reference electrode 44 spaced above the cartridge 11, the potential of the other terminal of resistor 41 may be taken as the predetermined constant potential which it is desired to maintain at the junction point 40. Hence, the junction point 40 and junction point 45 of the resistors of 41, 42 are connected to the respective terminals of the primary winding of transformer 46 by insulated conductor 47 so that any error between the potential of junction point 40 and the constant potential maintained across resistor 41 is coupled to the input of an amplifier 48. This amplifier 48, which may be of conventional design, amplifies the error signal and supplies it to a phase sensitive detector 49 which has supplied to its reference input circuit a signal from signal generator 30. The output of the phase sensitive detector is supplied to the gain control circuit of the variable gain amplifier 32 as a D.C. signal varying above and below a reference value in accordance with the sense of the error signal, the sense of the gain control effected being such as to reduce the error signal substantially to zero by a suitable adjustment in the magnitude of the auxiliary current.

In order to obtain conductivity indications which have a significance corresponding to the resistivity indications obtained with systems in accordance with the aforementioned H. G. Doll Patent No. 2,712,627, survey current is emitted from the main electrode $A_0$ in phase with the auxiliary current emitted from electrodes $A_1$, $A_2$ and with a magnitude adjusted by amplifier means 50 to obtain a substantially zero potential gradient along the borehole intermediate the electrodes. In accordance with the present invention, this result is obtained over widely varying borehole conditions by rendering amplifier means 50 responsive not only to the potential difference between the pick-up electrodes $M_1$, $M_2$ but also responsive to a potential representing the potential at a point in the vicinity of the main electrode $A_0$ measured with respect to the potential at a remote reference point. Thus, a section 51 of amplifying means 50 has its input coupled by a transformer 52 and insulated conductors 53, 54 to the pick-up electrodes $M_1$, $M_2$, respectively, so as to amplify the potential difference between these electrodes to a relatively high level. A second section 55 of the amplifying means 50 has its input terminals connected to the output terminals of the first section 51 by conductors 56, 57. The second amplifier section 55 preferably has a gain G maintained at substantially unity and has the secondary winding of its output step-down transformer 58 connected in the survey current circuit. This circuit is provided by connecting one terminal of the secondary winding of transformer 58 through insulated conductor 59 to the main electrode $A_0$ and connecting the other terminal of the secondary winding through conductor 60 to a remote current return electrode 61 spaced above the cartridge 11. The input terminals to the second section 55 of the amplifying means are also coupled by means of an input transformer 62 across the resistor 41 for response to the constant A.C. potential supplied by the signal generator 30 and maintained in equality with the potential of junction point 40 measured with respect to a remote reference point. Since the potential across the primary winding of transformer 46 is maintained substantially zero by degenerative feedback, the primary winding of transformer 62 is effectively connected between the junction point 40 and the remote reference point 44 so as to apply a potential to the input of amplifier section 55 which corresponds with the potential between a point in the vicinity of the main electrode $A_0$ and a remote reference point.

To obtain indications of apparent formation conductivity, a resistor 64 is connected in series with the main electrode $A_0$ so as to develop a potential drop proportional to the survey current emitted from the main electrode. This potential drop across resistor 64 is coupled by a transformer 65 to the input circuit of an amplifier 66. The output of amplifier 66 is connected to the input circuit of a phase sensitive detector 67 which may be similar in design to phase sensitive detector 49 and similarly supplied with a reference signal from the signal generator 30. The output of the phase sensitive detector, which is a D.C. signal of reversible polarity, is transmitted by cable conductors 21, 22 to the input of the recorder 24 at the surface.

In an exemplary operation of the apparatus of Fig. 1, power is supplied to the electronic cartridge 11 as the cartridge and the electrode array are moved past formations to be investigated. The record of recorder 24 is advanced in correspondence with the depth of the electrode array to provide a log of conductivity indications.

The conductivity indications obtained are given the desired significance for interpretation purposes by controlling the emission of current from the auxiliary electrodes so as effectively to maintain the potential at a point in the vicinity of the main electrode $A_0$ at substantially a constant value represented by the potential developed by signal generator 30 across resistor 41. Maintenance of this constant potential is insured by feedback adjustment of the gain of variable gain amplifier 32 in response to the amplified and detected version of the error signal representing a difference between the constant potential across resistor 41 and the potential existing at the junction point 40.

The magnitude of the potential difference produced between the potential pick-up electrodes $M_1$, $M_2$ by a given change in the survey current emitted from main electrode $A_0$ is dependent upon the ratio of the true resistivity $R_t$ of formations opposite the main electrode and the resistivity $R_m$ of the mud or like fluid 13 filling the borehole. When this ratio is quite high, as in the presence of salty drilling muds for which $R_m$ is very low, a large change in the survey current is required to produce a change in the potential gradient measured between the pick-up electrodes. In order, then, to reduce the potential gradient substantially to zero, a relatively high gain would, according to previous practice, be required of amplifier means 50. However, under these same conditions of a relatively large ratio $R_t/R_m$, the potential at a point in the vicinity of the main electrode should be at substantially the same value as the potential of the main electrode if a zero potential gradient along the borehole is to be substantially achieved at such point.

Taking advantage of this consideration, the amplifying means 50 is, according to the present invention, made largely responsive to the constant potential coupled via transformer 62 and representing the potential at the mid point of electrodes $M_1$, $M_2$, whenever the amplified version of the potential difference between electrodes $M_1$ and $M_2$ is substantially less than the constant potential. Thus, the amplifier section 51 may have a gain, for example, on the order of fifty thousand and yet the constant potential coupled at a 1:1 ratio by transformer 62 will be substantially greater than the output of amplifier section 51 with high values of $R_t/R_m$. In this manner, the correct value of the survey current may be obtained in response to the sum of the constant potential and the amplified potential difference without requiring that the gain of the amplifying means applied to the potential difference between electrodes $M_1$ and $M_2$ be excessive. It may be noted that the 1:1 ratio of the transformer 62 and the unity gain of the amplifier section 55 ensures that the potential of the main electrode $A_0$ equals the value of the potential measured at a point intermediate electrodes $M_1$, $M_2$, plus the amplified potential difference.

Under less severe borehole conditions, the potential gradient intermediate the electrodes $M_1$, $M_2$ is sufficiently responsive to the adjustment of survey current that a substantial amplified signal is derived from amplifier section 51 which, when added to the constant signal supplied via transformer 62, results in a potential of the main electrode greater than the potential midway between the pick-up electrodes $M_1$, $M_2$ and sufficient to establish substantially a zero potential gradient between the pick-up electrodes. An exemplary value of the constant potential which the main electrode may have is 20 millivolts.

Having obtained the correct adjustment of the survey current emitted from the main electrode by the operation of the amplifying means 50, the magnitude of this survey current is converted by resistor 64 to a measure potential which is amplified and transmitted to the surface as a D.C. potential for recording as a function of the depth of the electrode array in the borehole. While the indications recorded directly in response to the transmitted measure signal are representative of apparent formation conductivity, the measure signal may be processed by a reciprocal computer in a well known manner to obtain recorded indications of apparent formation resistivity. Such indications are accurately representative of true formation resistivities and conductivities as a result of the control of current and potential distribution obtained in the manner described.

Measure signals directly proportional to apparent formation resistivity may be obtained in accordance with the embodiment of the invention represented in Fig. 2 wherein different circuitry is employed within the cartridge 11. Thus, the power conductors 18, 19 are connected to the input of an oscillator 70 having its output coupled by transformer 58 into the survey current circuit to generate an alternating survey current of substantially constant value for emission from the main electrode $A_0$. The connection of amplifier section 51 for the amplifying means 50 is unchanged, but the unity coupling transformer 62 has one terminal of its primary winding connected to the main electrode $A_0$ and the other terminal connected to the remote point 61 so as to inject a signal representing the potential of the main electrode into the amplifying means. The coupling transformer 33 is here employed as the output transformer for amplifier section 55, the secondary winding of this transformer being again connected in the auxiliary current circuit, as in the system of Fig. 1.

To obtain a measure of the apparent formation resistivity, the measure signal amplifier 66 has its input coupled by a transformer 71 for response to the potential between the pick-up electrode $M_1$ and the remote reference electrode 44. Conductor 47 serves to connect electrode $M_1$ to one terminal of the primary winding for transformer 71, while conductor 43 serves to connect the other terminal to the remote electrode 44.

In an exemplary operation of the apparatus of Fig. 2, which is generally similar to the operation of the apparatus of Fig. 1, constant survey current is emitted from the main electrode $A_0$ into the adjacent formations and is returned at a remote current return point, namely, at the electrode 61. By reason of the unity coupling of transformer 62 and the unity gain of amplifier section 55, the auxiliary electrodes $A_1$, $A_2$ are maintained at a potential at least as great as the potential of main electrode $A_0$. However, the amplifier section 55 is also responsive to an amplified version of the potential difference between pick-up electrodes $M_1$ and $M_2$, as derived from amplifier section 51. Thus, it is seen that the potential of the auxiliary electrodes is maintained at a potential which is the sum of the potential of the main electrode and a potential which is an amplified version of the potential difference or potential gradient between the pick-up electrodes $M_1$, $M_2$. Since the feed-back action of the amplifying means is degenerative, the potential gradient intermediate the electrodes is maintained substantially at zero.

Accordingly, the potential at a point in the vicinity of the main electrode such as that of measuring electrode $M_1$, measured with respect to a relatively remote reference point, is proportional to the apparent formation resistivity. This potential is amplified and transmitted to the recorder in the form of a D.C. potential for recording as a function of the depth of the electrode array in the borehole.

In lieu of the electrode array 10, a variety of electrode arrays may be employed, such as are represented in the above-mentioned H. G. Doll patents. For example, an electrode array 10' may be employed of the type disclosed in H. G. Doll Patent No. 2,712,629. As shown in Fig. 3, the main electrode $A_0$ in this embodiment of the invention is disposed centrally of a non-conductive pad 74, shown in section, and more specifically in the wall engaging oval face 75 of the pad. Also inlaid in the face 75 of the pad and surrounding the main electrode $A_0$ are a first pick-up electrode $M_1$, a second pick-up electrode $M_2$, and an auxiliary electrode $A_1$ at increasingly greater distances from the main electrode. As seen in the sectional view of Fig. 3, these electrodes include portions or segments spaced symmetrically above and below the main electrode, such portions being electrically connected so that the electrodes are each effectively continuous about the main electrode.

The pad 74 is supported by bowed springs 76 from the cartridge 11 so as to be resiliently urged against the borehole wall. Connections are made between the electrodes and the circuits within the cartridge by conductors 34, 47, 53, 54 and 59. The connections may be made in either the circuits of Figs. 1 and 2 and the operation will be substantially as described above. By employing the electrode array 10' of Fig. 3, however, the resistivity or conductivity indications derived will have a significance similar to those obtained with apparatus as disclosed in H. G. Doll Patent No. 2,712,629 and representing a shallower depth of investigation than is obtained with the electrode array 10.

The invention is susceptible to various other modifications within its purview. For example, the potentials to which the amplifying means is responsive may be coupled in other ways and their combination may be obtained by other than an algebraic summation. Rather than employing resistors 38, 39 to provide a junction point at which the potential intermediate pick-up electrodes $M_1$, $M_2$ may be measured, the conductor 47 may instead be connected to the midtap of the primary winding of transformer 52. Although the potential gradient along the borehole intermediate the main and auxiliary electrodes is actually picked up, using the electrode array 10, in the use of electrode array 10', the potential difference actually picked up may represent a potential gradient transverse to the axis of the borehole. The resulting feedback will, nonetheless, maintain the potential gradient along the borehole intermediate the main and auxiliary electrodes at substantially zero.

Accordingly, it will be understood that the particular embodiments of the invention illustrated and described are merely exemplary and that they are susceptible of variation and modification without departing from the spirit and scope of the invention, as defined in the appended claims.

I claim:

1. In well logging apparatus, the combination comprising a main electrode and an auxiliary electrode spaced above and below said main electrode disposed for movement longitudinally through a borehole, first means for passing survey current between said main electrode and a current return point through adjacent formations, second means for passing auxiliary current between an auxiliary electrode and a current return point, one of said means including feedback circuit means responsive to the potential difference between a pair of points spaced along the borehole intermediate said electrodes and including means for adding a potential representative of the potential of a point in the vicinity of said main electrode for degeneratively adjusting the current passed by said one means as a function of both said potential difference and said potential, and means responsive to at least one of the survey current and the potential of a point in the vicinity of said main electrode for producing a signal which is a function of formation conductivity.

2. In well logging apparatus, the combination comprising a main electrode and an auxiliary electrode spaced from said main electrode disposed for movement longitudinally through a borehole, first means for passing survey current between said main electrode and a current return point through adjacent formations, second means for passing auxiliary current between said auxiliary electrode and a current return point, one of said means including feedback amplifier circuit means responsive to an amplified version of the potential gradient along the borehole intermediate said electrodes and including means for adding a potential representing the potential of a point in the vicinity of said main electrode for degeneratively adjusting the current passed by said one means as a function of both said potential gradient and said potential, and means for producing a signal which varies as the ratio of the survey current and the potential of a point in the vicinity of said main electrode for representing a function of formation resistivity.

3. In well logging apparatus, the combination comprising a main electrode and an auxiliary electrode spaced above and below said main electrode disposed for movement longitudinally through a borehole, first means for passing survey current between said main electrode and a current return point through adjacent formations, second means for passing auxiliary current between an auxiliary electrode and a current return point, one of said means including feedback circuit means responsive to the potential gradient along the borehole intermediate said electrodes and including means for adding a potential representative of the potential of a point in the vicinity of said main electrode for degeneratively adjusting the current passed by said one means as a function of both said potential gradient and said potential, means for maintaining the potential of a point in the vicinity of said main electrode substantially constant, and means responsive to the current emitted from said main electrode for producing a signal which is a function of formation conductivity.

4. In well logging apparatus, the combination comprising a main electrode and an auxiliary electrode spaced above and below said main electrode disposed for movement longitudinally through a borehole, first means for passing a substantially constant survey current between said main electrode and a current return point through adjacent formations, second means for passing auxiliary current between said auxiliary electrode and a current return point, said second means including feedback circuit means responsive to the potential gradient intermediate said electrodes and including means for adding a potential representative of the potential of a point in the vicinity of said main electrode for degeneratively adjusting the current passed by said second means as a function of both said potential gradient and said potential, and means responsive to the potential between a point in the vicinity of said main electrode and a reference point for producing a signal which varies as a function of formation resistivity.

5. In well logging apparatus, the combination comprising a main electrode and an auxiliary electrode spaced above and below said main electrode disposed for movement longitudinally through a borehole, first means for passing survey current between said main electrode and a current return point through adjacent formations, second means for passing auxiliary current between said auxiliary electrode and a current return point, one of said means including feedback amplifier circuit means responsive to the sum of an amplified version of the potential gradient along the borehole intermediate said main and auxiliary electrodes and a potential representing the potential of a point in the vicinity of said main electrode for adjusting the current passed by said one means degeneratively as a function of said sum to reduce said potential gradient substantially to zero, and means responsive to at least one of the survey current and the potential of a point in the vicinity of said main electrode for producing a signal which varies as a function of formation conductivity.

6. In well logging apparatus, the combination comprising a main electrode and an auxiliary electrode spaced above and below said main electrode disposed for movement longitudinally through a borehole, first means for passing survey current between said main electrode and a remote current return point through adjacent formations, second means for passing auxiliary current between said auxiliary electrodes and a remote current return point, one of said means including feedback amplifier circuit means responsive to the sum of an amplified version of the potential gradient along the borehole intermediate said main and auxiliary electrodes and of a potential representing the potential of a point in the vicinity of said main electrode with respect to a remote reference point for setting the potential of the electrode from which it passes current substantially equal to said sum, and means responsive to at least one of the survey current and the potential of a point in the vicinity of said main electrode for producing a signal which varies as a function of formation conductivity.

7. In well logging apparatus, the combination comprising a main electrode and an auxiliary electrode spaced above and below said main electrode disposed for movement longitudinally through a borehole, feedback amplifying means including a high gain section and a unity gain section for passing survey current between said main electrode and a current return point through adjacent formations, variable gain amplifying means for passing auxiliary current between said auxiliary electrodes and a current return point, said high gain amplifying section being responsive to the potential gradient along the borehole intermediate said main and auxiliary electrodes for producing a potential which is an amplified version of said potential gradient, gain control means responsive to the departure of the potential at a point in the vicinity of said main electrode from a constant value for adjusting the gain of said variable gain amplifying means for adjusting the auxiliary current to maintain the potential of said point constant, said unity gain amplifying section being responsive to the sum of the amplified potential gradient and the constant potential for degeneratively passing survey current in an amount necessary to reduce the potential gradient substantially to zero, and means responsive to the magnitude of the survey current for producing indications which represent the conductivity of adjacent formations.

8. In well logging apparatus, as defined in claim 7 the combination wherein said auxiliary electrodes are spaced longitudinally of said main electrode, and pick-up electrodes are longitudinally spaced apart intermediate said main and auxiliary electrodes to derive a potential difference representing the potential gradient to which said high gain amplifying section is responsive.

9. In well logging apparatus, the combination comprising a main electrode and an auxiliary electrode spaced above and below said main electrode disposed for movement longitudinally through a borehole, electric source means for passing a substantially constant survey current between said main electrode and a current return point through adjacent formations, feedback amplifying means including a high gain section and a unity gain section for passing an adjustable auxiliary current between said auxiliary electrodes and a current return point, said high gain amplifying section being responsive to a potential difference representing a potential gradient intermediate said main and auxiliary electrodes for producing an amplified potential representing an amplified version of said potential gradient, said unity gain amplifying section being responsive to the sum of said amplified potential and the potential of said main electrode with respect to a reference point for degeneratively controlling the auxiliary current to maintain said potential gradient substantially at zero, and means responsive to the potential of a point in the vicinity of said main electrode with respect to a reference point for producing indications representing a function of the resistivity of adjacent formations.

10. In well logging apparatus, the combination comprising a main electrode and an auxiliary electrode spaced above and below said main electrode and encircling the same, said electrodes being disposed for movement longitudinally through a borehole, means for maintaining said electrodes in electrical contact with the wall of the borehole and insulated from well fluid in the borehole, first means for passing survey current between said main electrode and a current return point through adjacent formations, second means for passing auxiliary current between said auxiliary electrode and a current return point, one of said means including feedback circuit means responsive to an amplified version of the potential gradient along the borehole intermediate said electrodes and including means for adding a potential representative of the potential of a point in the vicinity of said main electrode for degeneratively adjusting the current passed by said one means as a function of both said potential gradient and said potential, and means responsive to at least one of the survey current and the potential of a point in the vicinity of said main electrode for producing a signal which is a function of formation conductivity.

11. In apparatus for investigating earth formations traversed by a borehole, the combination comprising: means for passing survey current from a point in the borehole into adjacent earth formations; means for emitting auxiliary current in the borehole in the vicinity of said point for controlling the current flow pattern of said survey current; one of said means including feedback circuit means responsive to the resulting potential difference between a location in the vicinity of said point and a reference point spaced apart therefrom for adjusting the current passed by said one means to maintain a desired survey current pattern; means for adding to the signal translated by said feedback circuit means a signal having a magnitude representative of at least one value of the potential between a second point in the vicinity of said first-mentioned point and a reference point thereby to reduce the gain required of the feedback circuit means; and means responsive to the flow of at least one of said currents for obtaining indications representative of formation resistivity.

12. In apparatus for investigating earth formations traversed by a borehole, the combination comprising: means for passing survey current from a point in the borehole into adjacent earth formations; means for emitting auxiliary current in the borehole in the vicinity of said point for controlling the current flow pattern of said survey current; one of said means including feedback circuit means responsive to the resulting potential difference between a location in the vicinity of said point and a reference point spaced apart therefrom for adjusting the current passed by said one means to maintain a desired survey current pattern; means for adding to the signal translated by said feedback circuit means a signal having a magnitude proportional to the potential between a second point in the vicinity of said first-mentioned point and a reference point thereby to reduce the gain required of the feedback circuit means; and means responsive to the flow of at least one of said currents for obtaining indications representative of formation resistivity.

13. In apparatus for investigating earth formations traversed by a borehole, the combination comprising: an electrode array adapted for movement through the borehole and including thereon a main electrode and an auxiliary electrode spaced apart therefrom; means for passing survey current between said main electrode and a current return point; means for passing auxiliary current between said auxiliary electrode and a current return point for controlling the current flow pattern of said survey current; one of said means including feedback circuit means responsive to the resulting potential difference between a pair of spaced apart points in the region defined by said electrodes for adjusting the current passed by said one means to maintain a desired survey current pattern; means for adding to the signal translated by said feedback circuit means a signal having a magnitude substantially equal to the potential between a point in the vicinity of said main electrode and a reference point thereby to reduce the gain required of the feedback circuit means; and means responsive to the flow of at least one of said currents for obtaining indications representative of formation resistivity.

References Cited in the file of this patent

UNITED STATES PATENTS

| | | |
|---|---|---|
| 2,712,627 | Doll | July 5, 1955 |
| 2,712,628 | Doll | July 5, 1955 |
| 2,712,629 | Doll | July 5, 1955 |
| 2,803,796 | Schuster | Aug. 20, 1957 |